United States Patent
Sanada

(10) Patent No.: US 7,289,576 B2
(45) Date of Patent: Oct. 30, 2007

(54) UWB TRANSMITTER INCLUDING AN ECHO DETECTOR

(75) Inventor: Yukitoshi Sanada, Tokyo (JP)

(73) Assignee: Keio University, Toyko (JP)

( * ) Notice: Subject to any disclaimer, the term of this patent is extended or adjusted under 35 U.S.C. 154(b) by 756 days.

(21) Appl. No.: 10/643,148

(22) Filed: Aug. 19, 2003

(65) Prior Publication Data
US 2004/0174925 A1  Sep. 9, 2004

(30) Foreign Application Priority Data
Aug. 21, 2002  (JP) ............... 2002-241249

(51) Int. Cl.
*H04K 1/02* (2006.01)
(52) U.S. Cl. .................... 375/296
(58) Field of Classification Search ............ 375/130, 375/132, 140, 340, 343, 219, 222, 296; 379/399, 379/400, 402, 415, 416
See application file for complete search history.

(56) References Cited

U.S. PATENT DOCUMENTS 6,711,216 B2 * 3/2004 Hannah .................... 375/296

2003/0186713 A1   10/2003 Sugaya et al.
2004/0174925 A1 *  9/2004 Sanada ................... 375/130

FOREIGN PATENT DOCUMENTS

| JP | 2003-152594 | 5/2003 |
|---|---|---|
| JP | 2003-258812 | 9/2003 |
| WO | 01/73965 | 10/2001 |

OTHER PUBLICATIONS

Nikkei Electronics, [Ultra Wideband], Mar. 11, 2002, pp. 55-66, Japan (Publication date: Mar. 11, 2002).

* cited by examiner

*Primary Examiner*—David C. Payne
*Assistant Examiner*—Aslan Ettehadieh
(74) *Attorney, Agent, or Firm*—Edwards Angell Palmer & Dodge LLP

(57) ABSTRACT

The present invention provides a UWB transmitter and receiver, the transmission rate of which is increased, and the SN ratio of which is improved. By investigating the polarity of an echo at ½ position of the chip period Tc, the chip period is shortened to Tc/2 where the polarity of the echo is the same and a pulse signal of the same polarity is continued, whereby it becomes possible to increase the transmission rate. Because the echo and the pulse signal are caused to overlap each other, the SN ratio can be improved.

4 Claims, 5 Drawing Sheets

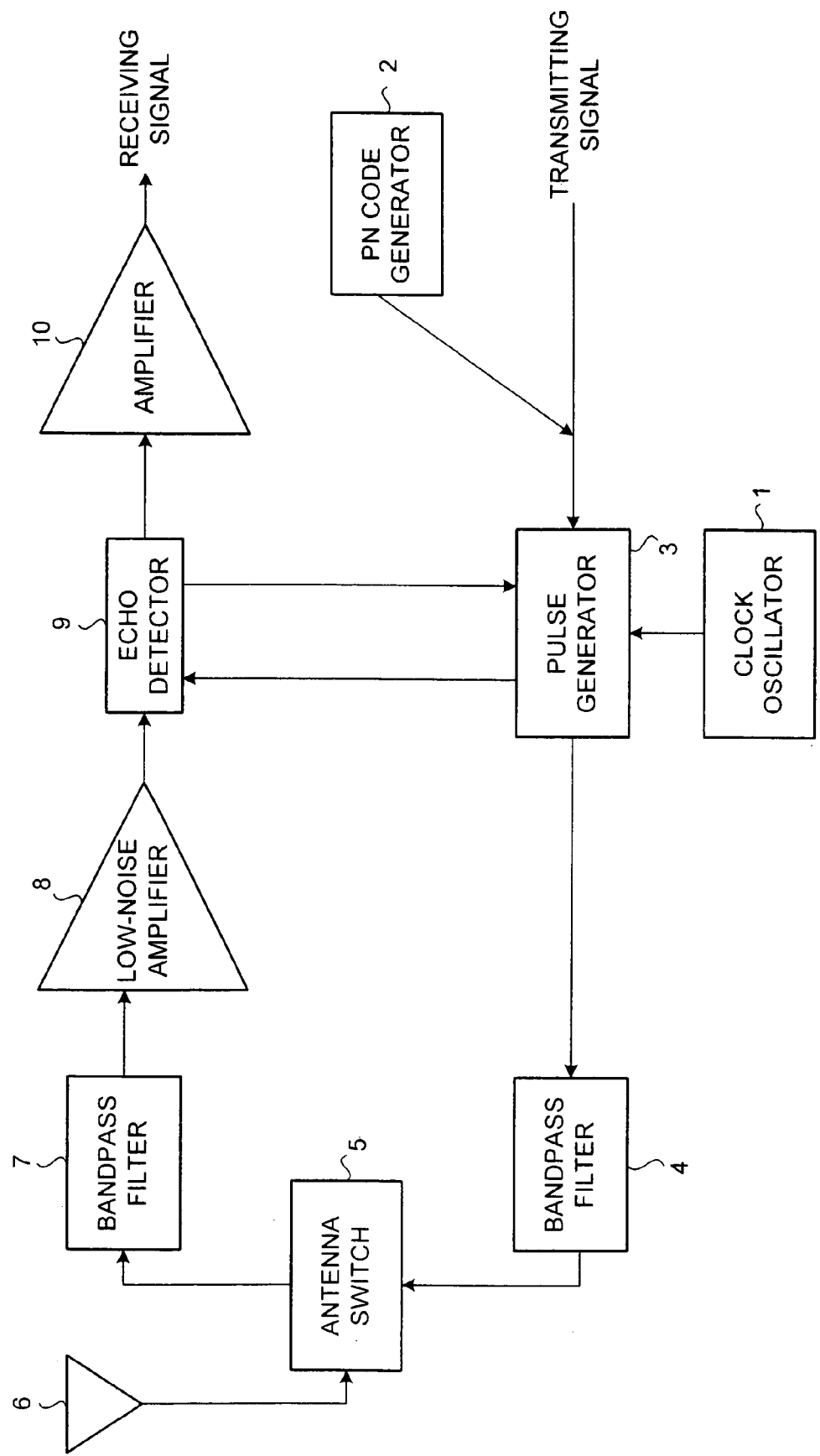

UWB TRANSMITTER INCLUDING AN ECHO DETECTOR

BACKGROUND OF THE INVENTION

1. Field of the Invention

The present invention relates to a UWB (Ultra Wide Band) transmitter and receiver, and in particular it relates to a UWB transmitter and receiver which increase the transmission rate and improve the SN (signal-to-noise) ratio.

2. Description of the Related Art

A communication system using very short pulse signals for a so-called UWB system has been proposed (Refer to "Nikkei electronics," Edition Mar. 11, 2002, Pages 55 through 66). The UWB system does not utilize any carrier waves or any intermediate frequency (IF), and it has features of a remarkably wide band and low consumption power, etc. As a major object of utilization of the UWB system, an ultra high-speed transmission among peripheral devices of a PC (personal computer) may be listed.

FIG. 3 is a view showing a configuration of a transmitter-receiver according to a related art super heterodyne system. A transmitting signal is converted to a high frequency signal by a mixer 21 with local oscillation signal from a voltage controlled oscillator (VCO) 22, is amplified in terms of high frequency by a power amplifier 23, is limited to a prescribed band by a bandpass filter 24, passes through an antenna switch 25, and is radiated from an antenna 26. When receiving, a high frequency signal received by the antenna 26 passes through the antenna switch 25, is limited to a prescribed band by the bandpass filter 27, is amplified by a low-noise amplifier 28, is made into an intermediate frequency signal by a mixer 29 by being mixed with local oscillation signal from the voltage controlled oscillator 22, is limited to a prescribed intermediate frequency band by the bandpass filter 30, is amplified by the amplifier 31, and is converted to a baseband signal which is a receiving signal by the mixer 32.

FIG. 4 is a view showing a configuration of a prior art UWB transmitter-receiver. A pulse generator 43 is controlled by a clock from a clock oscillator 41, and a transmitting signal is input into the pulse generator 43 into which a PN (Pseudo Noise) code from the PN code generator 42 is input. The pulse generator 43 generates, for example, a pulse train of {1, 1, −1, 1} with respect to a transmitting signal 1, and a pulse train of {−1, −1, 1, −1} with respect to a transmitting signal −1 (Direct Sequence Spread Spectrum). Herein, a bi-phase is employed, that is, a pulse having a positive polarity and a pulse having a negative polarity are used. The pulse train is limited to a remarkably wide prescribed band by a bandpass filter 44, passes through the antenna switch 45 without being converted in terms of frequency, and is radiated from the antenna 46. Radiated power is weak. However, sufficient information can be transmitted since the frequency band is remarkably wide and short-haul communications are assumed. When receiving, a pulse train signal which is received by the antenna 46 in an ultra wide band passes through the antenna switch 45, is limited to a prescribed band by the bandpass filter 47, and is amplified by a low-noise amplifier 48. A correlator 49 respectively detects a correlation between the received pulse train that is not converted in terms of frequency and the same pulse trains {1, 1, −1, 1} or {−1, −1, 1, −1} as those in the pulse trains used for transmission from the pulse generator 43, and the correlation output is amplified by an amplifier 50, wherein if the correlation between the received pulse train and reference pulse trains is sufficiently large, a receiving signal 1 or −1 can be obtained.

The transmission speed of the UWB system depends on a multipath (=echo) in a communication path. If an echo exists, it is difficult to distinguish which pulse is a true transmitting signal. Therefore, usually, the chip period (pulse repetition period) is defined so as to generate a next pulse at the intervals to make the size of the echo sufficiently small. Thus, the transmission rate is limited by the echo.

SUMMARY OF THE INVENTION

In view of the above-described problems and shortcomings, it is therefore an object of the present invention to provide a UWB transmitter and receiver the transmission rate of which is increased, and the SN ratio of which is improved.

A UWB transmitter according to the invention comprises: an echo detector for detecting the polarity of an echo at the position of the second chip period that is shorter than the first chip period which is the original chip period, and a pulse generator for generating a pulse at the second chip period when generating a pulse of the same polarity as that of the immediately preceding pulse and generating a pulse at the first chip period when generating a pulse of the inverse polarity to that of the immediately preceding pulse where the echo detected by the echo detector has the same polarity, and for generating a pulse at the first chip period when generating a pulse of the same polarity as that of the immediately preceding pulse and generating a pulse at the second chip period when generating a pulse of the inverse polarity to that of the immediately preceding pulse where the echo detected by the echo detector has the inverse polarity.

Also, because the second chip period is ½ of the first chip period, the clock control can be facilitated.

Also, because the echo detector operates as a correlator for decoding the codes in a receiver, the configuration can be simplified.

In addition, a UWB receiver according to the invention comprises: an echo detector for detecting the polarity of an echo at the position of the second chip period that is shorter than the first chip period which is the original chip period; a pulse generator for generating a pulse at the second chip period when generating a pulse of the same polarity as that of the immediately preceding pulse and generating a pulse at the first chip period when generating a pulse of the inverse polarity to that of the immediately preceding pulse where the echo detected by the echo detector has the same polarity, and for generating a pulse at the first chip period when generating a pulse of the same polarity as that of the immediately preceding pulse and generating a pulse at the second chip period when generating a pulse of the inverse polarity to that of the immediately preceding pulse where the echo detected by the echo detector has the inverse polarity; and a correlator for correlating a pulse train from the pulse generator and a received signal.

The present specification includes the contents described in the specification and/or drawings of Japanese Unexamined Patent Publication No. 2002-241249 that is the foundation of a priority request of the present application.

BRIEF DESCRIPTION OF THE DRAWINGS

FIG. 1 is a view showing a configuration of a UWB transmitter and receiver according to one embodiment of the present invention;

Figure 2A:
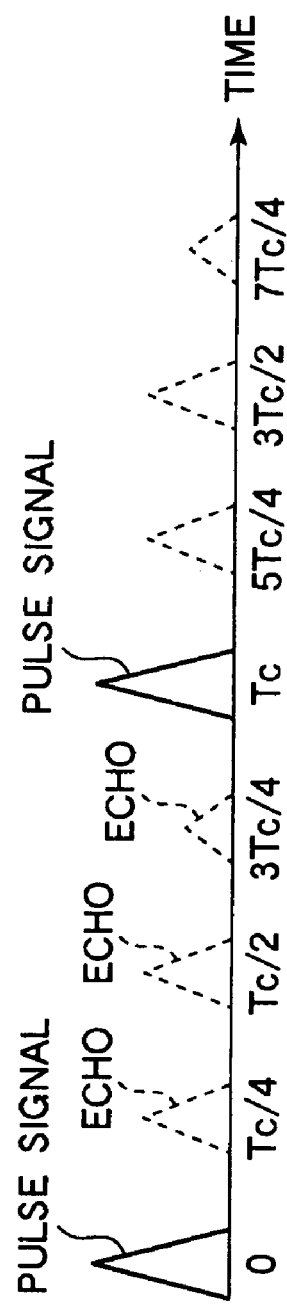
FIG. 2 is a view describing a pulse used for the present embodiment.

DESCRIPTION OF REFERENCE NUMBERS 1, 41 Clock oscillators
2, 42 PN code generators
3, 43 Pulse generators
4, 7, 44, 47 Bandpass filters
5, 45 Antenna switches
6, 46 Antennas
8, 48 Low-noise amplifiers
9, 49 Correlators
10, 50 Amplifiers
21, 29, 32 Mixers
22 Voltage controlled oscillator
23 Power amplifier
24, 27, 30 Bandpass filters
25 Antenna switch
26 Antenna
28 Low-noise amplifier
31 Amplifier

DETAILED DESCRIPTION OF EXEMPLARY EMBODIMENTS

Hereinafter, a detailed description is given of exemplary of the invention with reference to the accompanying drawings.

Figure 4:
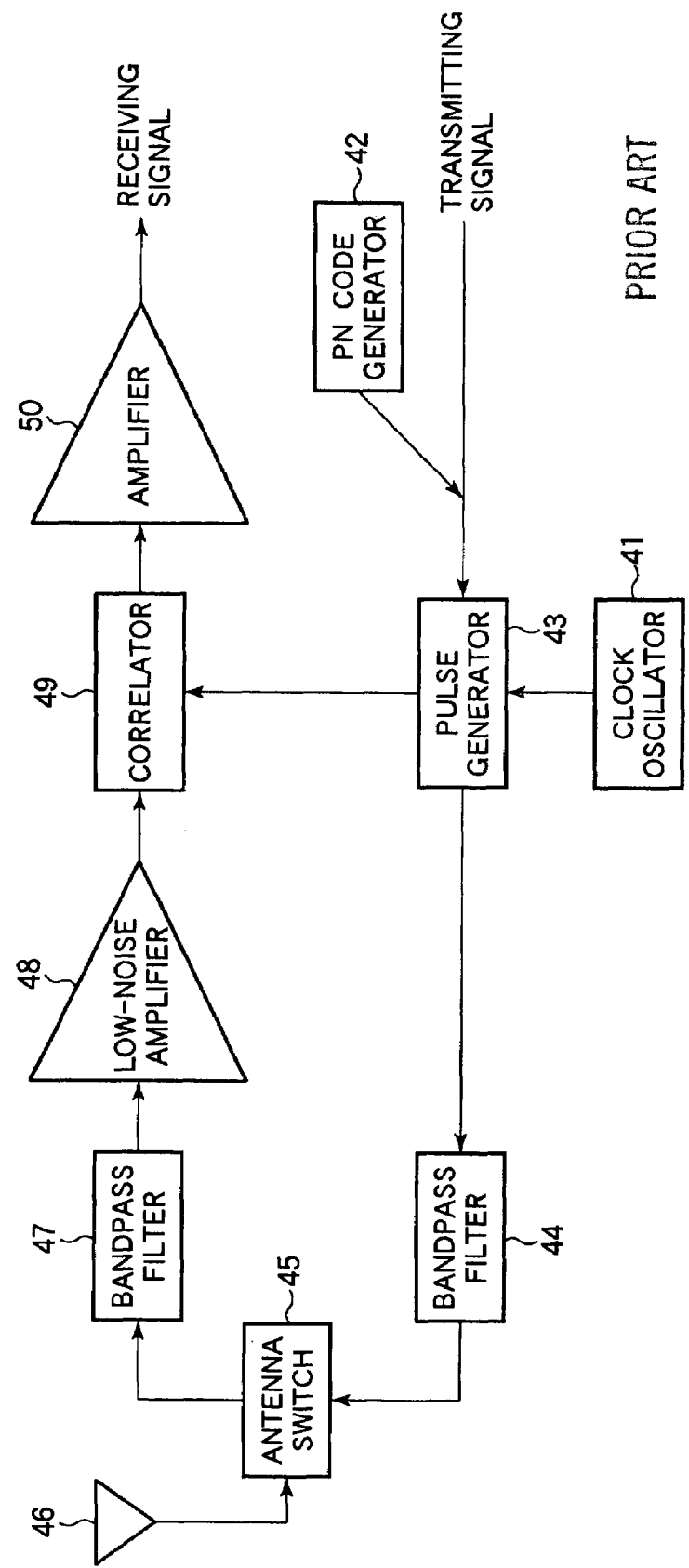
FIG. 4 is a view showing the configuration of a prior art UWB transmitter-receiver.

FIG. 1 is a view showing a configuration of a UWB transmitter and receiver according to one embodiment of the invention. Herein, although the configuration of the UWB transmitter-receiver is illustrated, it can be regarded as a transmitter or as a receiver. Therefore, it is expressed as a UWB transmitter and receiver. The basic configuration, that is, the layout of respective components is identical to the configuration of a conventional UWB transmitter-receiver shown in FIG. 4. The present embodiment is constructed so that information regarding echoes is transferred from the correlator 9 to the pulse generator 3. With respect to the other points, respective components such as the clock oscillator 1, PN code generator 2, pulse generator 3, bandpass filter 4, antenna switch 5, antenna 6, bandpass filter 7, low-noise amplifier 8, correlator 9 and amplifier 10 respectively correspond to the clock oscillator 41, PN code generator 42, pulse generator 43, bandpass filter 44, antenna switch 45, antenna 46, bandpass filter 47, low-noise amplifier 48, correlator 49 and amplifier 50.

Figure 2B:
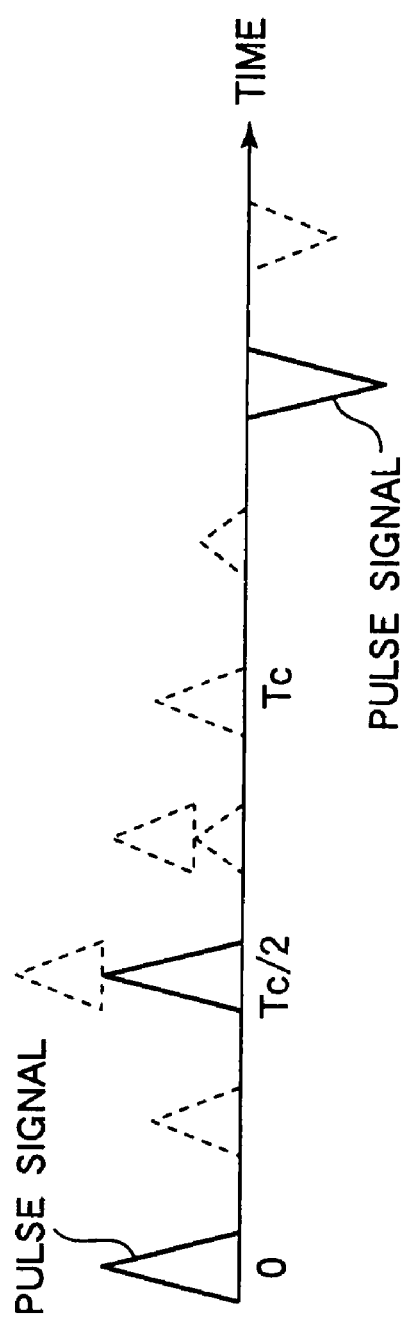
Figure 3:
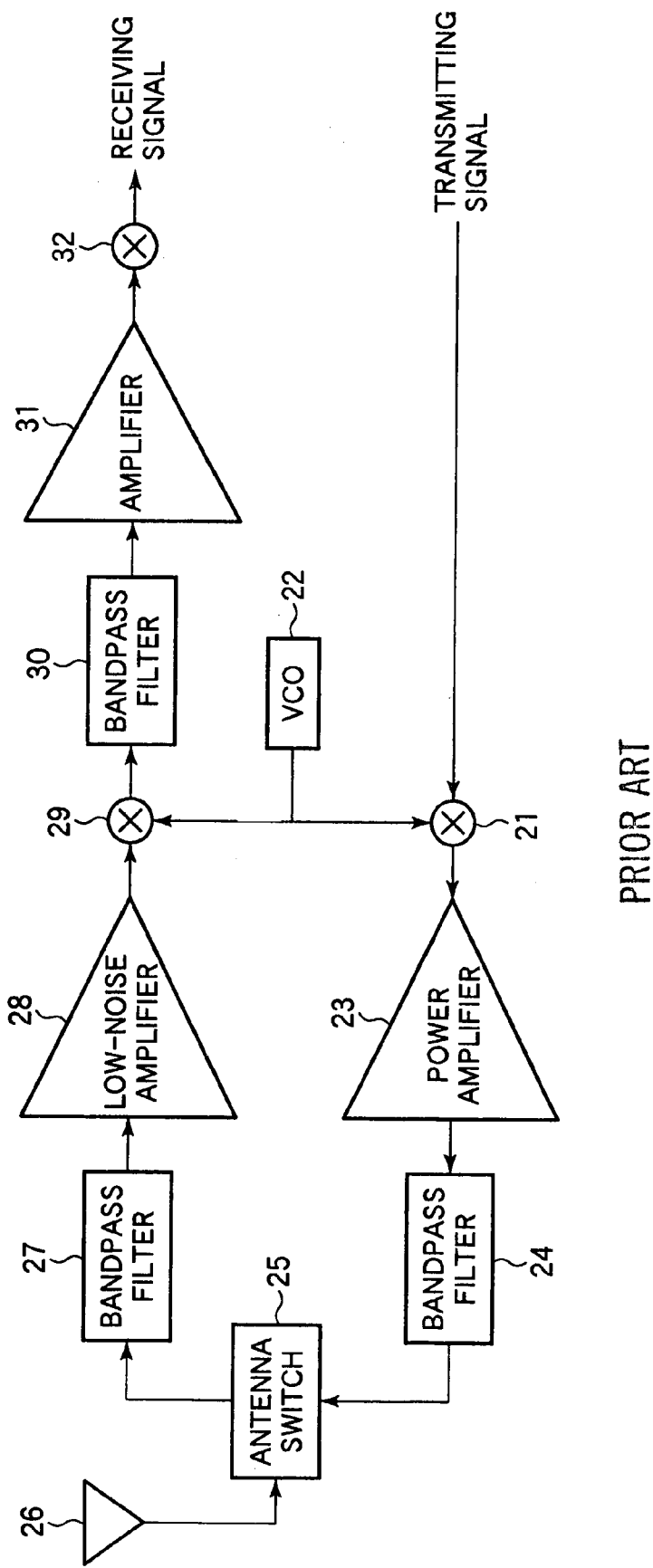
FIG. 3 is a view showing the configuration of a transmitter-receiver according to a prior art super heterodyne system.

FIG. 2(A), FIG. 2(B) and FIG. 2(C) are views describing a pulse used for a prior art and for the present embodiment. FIG. 2(A) is a view describing a pulse used for a prior art UWB transmitter-receiver, and a pulse train is transmitted from a transmitter at an interval of the chip period Tc which is an interval during which echoes can be sufficiently made small at a receiver. Echoes that gradually attenuate although being irregular exist between pulses received by the receiver, wherein there is a case where the echo has the same polarity as that of the pulse to be transmitted (in the present embodiment, the polarity becomes positive) or a case where the echo has the inverse polarity to the pulse (in the present embodiment, the polarity becomes negative).

FIG. 2(B) and FIG. 2(C) are views describing a pulse used for a UWB transmitter and receiver according to the present embodiment. In the present embodiment, the polarity of an echo at ½ position of the original chip period Tc, that is, at Tc/2 position, is investigated in advance, and the intervals of pulses generated by the pulse generator 3 are provided as follows; that is, (1) When an echo E12 at Tc/2 position has the same polarity as that of pulse P1 (see FIG. 2(B)); when the pulse P2 having the same polarity as that of the immediately preceding pulse P1 is generated, the chip period is made into Tc/2, and when the pulse P3 having the inverse polarity as that of the immediately preceding pulse P2 is generated, the chip period is made into Tc. (2) When an echo E12 at Tc/2 position has the inverse polarity to that of the pulse P1 (see FIG. 2(C)); when the pulse P2 having the inverse polarity to that of the immediately preceding pulse P1 is generated, the chip period is made into Tc/2, and when the pulse P3 having the same polarity as that of the immediately preceding pulse P2 is generated, the chip period is made into Tc.

Accordingly, where the chip period is made into Tc/2, the pulse signal and the echo are caused to overlap each other with the same polarity, and the amplitude of the signal is increased. Therefore, the SN ratio is improved. To the contrary, if the pulse signal and the echo are caused to overlap each other with the inverse polarity, the amplitude of the signal is decreased, wherein it is difficult to distinguish the signal from general noise, and the SN ratio is worsened. Therefore, the chip period is made into the original Tc. Thus, because it is possible to make the chip period into ½ at a probability of ½, it becomes possible to make the chip period into ¾ on average, wherein the transmission rate can be equivalently increased.

The following is best carried out in order to investigate the polarity of an echo at Tc/2 position in advance. That is, a pulse train of {1, −1} having the chip period of Tc is transmitted from a transmitter of a communications partner, and a correlation is detected with reference pulse trains of {1, 1, −1, −1} and {1, −1, −1, 1} having the chip period of Tc/2, respectively. By investigating which one shows a stronger correlation, is possible to investigate whether or not an echo at Tc/2 position is the same or inverse polarity. The correlator 9 transfers the result to the pulse generator 3, and the pulse generator 3 controls the chip period of a pulse, which is generated by utilizing the result, as described above. Pulse trains used by the pulse generator 3 for transmission, that is, a pulse train of {1, 1, −1, 1} with respect to the transmitting signal 1 and a pulse train of the transmitting signal −1 are used in the present embodiment as reference pulse trains when receiving. However, in the above embodiment, as described above, the chip period may be changed in response to the polarity of the echo and the polarity of adjacent pulses.

The present invention is not limited to the above-described embodiment.

Figure 5:
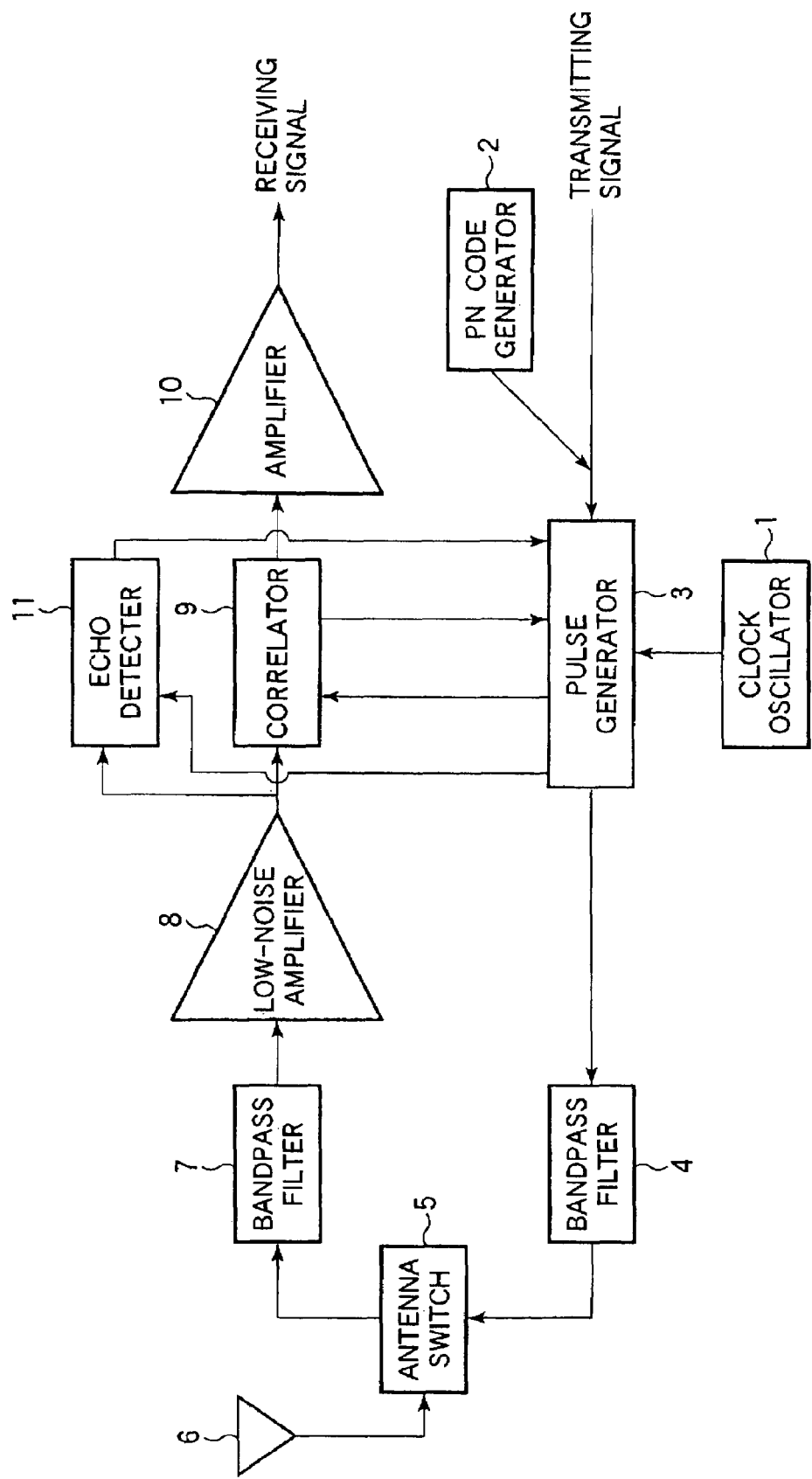
FIG. 5 is a view showing a configuration of a UWB transmitter and receiver according to a second embodiment of the present invention.

Although, in the above-described embodiment, the polarity of the echo is detected by the correlator 9 for receiving, a component may be additionally provided for detecting the polarity of the echo with respect to a pulse signal. For example, echo detector 11 may be connected in parallel with correlator 9, as shown in FIG. 5. Also, it may be constructed that the polarity of the echo is recognized by a communication means from a communications partner.

The chip period to be shortened is not limited to ½, wherein it may be ⅓, ¼, or ¾. However in view of simplification of the clock control, it is favorable that the chip period to be shortened is rounded off.

Coding by PN codes is not necessarily required. There is no problem if the chip period is changed, as described above, in response to the polarity of the echo and that of adjacent pulses.

As described above, according to the invention, a UWB transmitter and receiver can be provided, which can increase the transmission rate and can improve the SN ratio.

All publications, patents and patent applications cited in the present specification are included in the specification as references as they are.

The invention claimed is:

1. A UWB transmitter comprising:
    an echo detector for detecting a polarity of an echo at a position of a second chip period that is shorter than a first chip period, which is an original chip period in advance; and
    a pulse generator for generating a pulse at the second chip period when generating a pulse of a same polarity as that of an immediately preceding pulse and generating a pulse at the first chip period when generating a pulse of an inverse polarity to that of the immediately preceding pulse when the echo detected by said echo detector has the same polarity, and for generating a pulse at the first chip period when generating a pulse of the same polarity as that of the immediately preceding pulse and generating a pulse at the second chip period when generating a pulse of the inverse polarity to that of the immediately preceding pulse when the echo detected by said echo detector has the inverse polarity,
    wherein said echo dectector operates as a correlator for decoding codes in a receiver.

2. The UWB transmitter as set forth in claim 1, wherein the second chip period is ½ of the first chip period.

3. A UWB receiver comprising: an echo detector for detecting the polarity of an echo at the position of the second chip period that is shorter than the first chip period which is the original chip period in advance;
    a pulse generator for generating a pulse at the second chip period when generating a pulse of the same polarity as that of the immediately preceding pulse and generating a pulse at the first chip period when generating a pulse of the inverse polarity to that of the immediately preceding pulse where the echo detected by said echo detector has the same polarity, and for generating a pulse at the first chip period when generating a pulse of the same polarity as that of the immediately preceding pulse and generating a pulse at the second chip period when generating a pulse of the inverse polarity to that of the immediately preceding pulse where the echo detected by said echo detector has the inverse polarity; and
    a correlator for correlating a pulse train from said pulse generator and a received signal.

4. The UWB receiver as set forth in claim 3, wherein the second chip period is ½ of the first chip period.

* * * * *